United States Patent [19]
Bertram et al.

[11] 3,878,132
[45] Apr. 15, 1975

[54] EPOXY RESINS WHICH ARE GLYCIDYL ETHERS OF GLYCERINE

[75] Inventors: James L. Bertram, Lake Jackson, Tex.; David O. Bowen, Midland, Mich.

[73] Assignee: The Dow Chemical Company, Midland, Mich.

[22] Filed: Dec. 26, 1973

[21] Appl. No.: 428,556

Related U.S. Application Data

[63] Continuation of Ser. No. 306,794, Nov. 15, 1972, abandoned.

[52] U.S. Cl. ......... 260/2 EP; 117/161 ZB; 260/2 N; 260/2 BP; 260/47 EP; 260/47 EN; 260/49; 260/348 R; 260/348.6; 260/830 TW
[51] Int. Cl. ............................................. C08g 30/02
[58] Field of Search ....... 260/47 EP, 2 EP, 830 TW, 260/348, 49, 2 BP, 51 EP, 348.6

[56] References Cited
UNITED STATES PATENTS
3,705,115  12/1972  Bertram et al .......................... 260/2

FOREIGN PATENTS OR APPLICATIONS
175,613  2/1970  Argentina .............................. 260/2
863,364  2/1971  Canada ................................... 260/2
245,717  9/1962  Australia ................................ 260/2

*Primary Examiner*—Melvin Goldstein
*Assistant Examiner*—T. Pertilla
*Attorney, Agent, or Firm*—James G. Carter

[57] ABSTRACT

Epoxy resins which are glycidyl ethers of glycerine having improved physical properties, when cured to a thermoset condition, are the dehydrohalogenated reaction products of A. a mixture comprising from 0 to 49 percent by weight of a polyhydroxyl containing compound, such as polyglycerol, and from about 51 to 100 percent by weight of glycerine with B. a mixture comprising (1) 0.05 to 0.65 epoxy equivalents per mole of A of a polyepoxide, such as the diglycidyl ether of bisphenol A, and (2) from 1.35 to 2.95 epoxy equivalents per mole of A of an epoxy alkyl halide such as epichlorohydrin. When such products are cured with a catalytic quantity of a tertiary amine, they exhibit improved physical properties such as tensile strength, elongation, or tensile modulus.

8 Claims, No Drawings

EPOXY RESINS WHICH ARE GLYCIDYL ETHERS OF GLYCERINE

This is a continuation of application Ser. No. 306,794 filed Nov. 15, 1972 and now abandoned.

This invention relates to epoxy resins which are glycidyl ethers of glycerine having improved physical properties when cured and are prepared by reacting glycerine as a mixture of glycerine and polyhydroxyl-containing compound with a mixture comprising an epihalohydrin and a polyepoxide and dehydrohalogenating the resultant product and cured products thereof.

Glycidyl ethers of glycerine are well known in the art; however, when they are cured with catalytic quantities of a catalyst such as a tertiary amine, the physical properties of the resultant cured products are relatively poor.

The glycidyl ethers of this invention which exhibit, when cured, an improvement in one or more of the physical properties including tensile strength, elongation and tensile modulus are the dehydrohalogenated reaction products of A. a mixture comprising from about 0 to about 49 percent by weight of a polyhydroxyl-containing compound and from about 51 to about 100 percent by weight of glycerine, with B. a mixture comprising (1) from about 0.05 to about 0.65 and preferably from about 0.1 to about 0.5 epoxy equivalents per mole of A of a polyepoxide having more than one 1,2-epoxy group and (2) from about 1.35 to about 2.95 and preferably from about 1.35 to about 2.55 and most preferably from about 2.0 to about 2.95 epoxy equivalents per mole of (A) of an epoxyalkylhalide, and wherein the total epoxy equivalents of (B) is from about 2.0 to about 3.0 and preferably from about 2.0 to about 2.6 epoxy equivalents per mole of A.

The modified glycidyl ethers of glycerine of the present invention may, in some instances, be water soluble, but it is not a requirement that they be water soluble.

The glycidyl ethers of glycerine of the present invention are prepared by reacting a mixture of glycerine and a polyhydroxyl-containing compound with a mixture of a polyepoxide and an epoxyalkyl halide in the presence of a Lewis acid catalyst, dehydrohalogenating the resultant product and recovering the desired product therefrom.

The polyhydroxyl-containing compounds which may be mixed with glycerine to form component A employed in the present invention include, for example, aliphatic hydroxyl-containing compounds having from about 2 to about 8 hydroxyl groups, which include for example, glycols and halogenated glycols having from about 2 to about 10 carbon atoms such as, for example, ethylene glycol, butylene glycol, propylene glycol, neopentyl glycol, dibromoneopentyl glycol, dihydroxycyclohexane and the like; trihydroxyl containing compounds such as, glycerine, trimethylol propane, hexane triol and the like; and other polyhydroxy-containing compounds such as, for example, penaerythritol, sorbitol, sucrose, α-methyl glucoside, and the like and mixtures of any of the above compounds.

Polyoxyalkylene glycols having a molecular weight in the range of from about 200 to about 600, such as, for example, the polyoxyethylene glycols, polyoxypropylene glycols and the like, may also be employed as the polyhydroxyl-containing compounds as well as polyglycerol having a molecular weight of from about 165 to about 1,000 may also be employed as the polyhydroxyl-containing compound.

Other suitable polyhydroxyl-containing compounds are the aromatic polyhydroxyl-containing compounds which can be employed in the present invention include the dihydroxybenzenes such as, resorcinol, catechol, hydroquinone, and the like; bisphenol compounds including those represented by the general formula

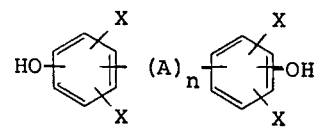

wherein A is selected from the group consisting of a divalent hydrocarbon radical containing from about 1 to about 8 carbon atoms,

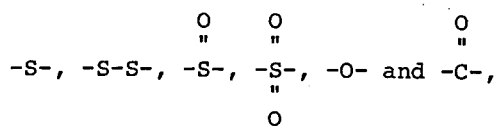

each X is independently selected from hydrogen, chlorine or bromine and $n$ has a value of zero or 1; the hydrogenated derivatives of the above compounds and mixtures of any of the above.

Other suitable polyhydroxyl-containing compounds include the hydrolyzed diglycidyl ethers of a polyhydric phenol represented by the general formulae

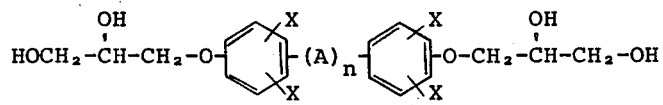

wherein X, A and $n$ are as previously defined; and

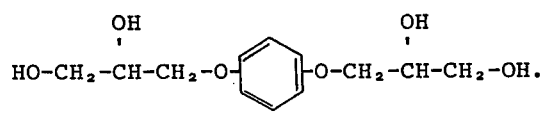

The term polyepoxide as used herein refers to polyepoxides having more than one 1,2-epoxy group such as the diglycidyl ethers of bisphenols represented by the following formulae:

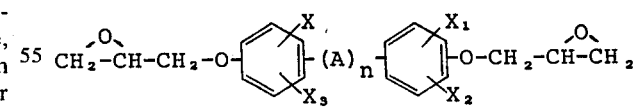

wherein A is selected from the group consisting of an alkylene or alkylidine group having from about 1 to about 8 carbon atoms, —O—, —S—, —S—S—,

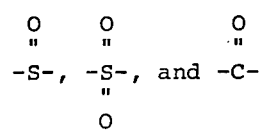

wherein X, $X_1$, $X_2$ and $X_3$ are independently selected from hydrogen, chlorine and bromine, and n has the value of zero or 1. Included as being representative of polyepoxides of the above formula are, for example, the diglycidyl ether of p,p'-isopropylidine diphenol, the diglycidyl ether of diphenyl oxide, mixtures thereof and the like.

Other suitable polyepoxides include the diglycidyl ethers of hydrogenated bisphenols represented by the formula

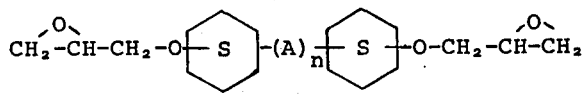

wherein A is selected from the group consisting of an alkylene or alkylidine group having from about 1 to about 8 carbon atoms, —S—, —S—S—,

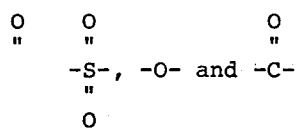

and n has a value of zero or 1.

Suitable such polyepoxides include the diglycidyl ether of hydrogenated p,p'-isopropylidine diphenol, mixtures thereof and the like.

Other suitable polyepoxides include the diglycidyl ethers of dihydric phenols such as, for example, the diglycidyl ethers of catechol, resorcinol, hydroquinone, mixtures thereof and the like.

Other suitable polyepoxides include the polyglycidyl ethers of such polyhydric aliphatic compounds such as neopentyl glycol, pentaerythritol, trimethylolpropane, their halogenated derivatives such as, for example, dibromoneopentyl glycol, dichloroneopentyl glycol, mixtures of the above and the like.

The term "epoxyalkyl halide" as used herein, refers to a compound comprising an alkane chain or cycloalkane ring having disposed thereon a vicinal epoxy group (oxirane group) and a halogen atom attached to a chain carbon atom which is not attached to the oxygen atom. Preferred compounds are those wherein the halogen atom is attached to a chain carbon atom which is directly attached to a carbon atom of an epoxy ring, the vicepoxy ring thus being in the alpha, beta-position relative to the halogen. These compounds have the structure

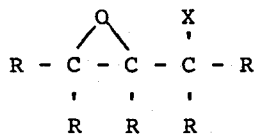

where X is a halogen atom and each R is selected from the group consisting of the hydrogen atom and alkyl groups of up to 4 carbon atoms. Representative compounds include 1-chloro-2,3-epoxypropane (epichlorohydrin), 1-bromo-2,3-epoxypropane (epibromohydrin); 1-chloro-2,3-epoxybutane; 1-iodo-2,3-epoxyhexane; 3-chloro-4,5-epoxyoctane; 1-chloro-2,3-epoxycyclohexane; 1-bromo-2,3-epoxy-3-methylbutane; 2-chloro-2-methyl-3,4-epoxypentane; and the like, preferably having from 3 to 8 carbon atoms per molecule. The most preferred compounds of this class, which combine a terminal halogen atom with a terminal epoxy group, are the epihalohydrins, e.g. epichlorohydrin and epibromohydrin. Because of the preponderant commercial importance of epichlorohydrin, relative to other epoxy-alkyl halides, the following description of the invention will be made largely in terms of that compound.

The general and preferred procedures for preparing the glycidyl ethers of glycerine of the present invention are the same as the procedures employed in the preparation of water soluble glycidyl ethers of glycerine given in a copending application Ser. No. 67,234 filed Aug. 26, 1970, by James L. Bertram and Pong Su Shih. So much of that specification as pertains to methods, procedures, reaction conditions, catalysts and the like are incorporated herein by reference.

The glycidyl ethers of glycerine of the present invention may be employed in adhesive formulations, castings, coatings and the like.

Although the compositions of the present invention may be cured with reactive curing agents such as primary and secondary amine containing compounds, aziridines, thiol-containing compounds, acid anhydrides and the like, the improved properties achieved by the present invention are more pronounced with the non-reactive catalytic curing agents such as tertiary amines, Lewis acid complexes, and the like.

Suitable non-reactive catalysts include, for example, benzyldimethylamine, borontrifluoride complex with monoethanolamine, dicyandiamide, dimethylamino methylphenol, tridimethylaminomethyl phenol, alphamethylbenzyl dimethylamine, mixtures thereof and the like.

These catalysts may be employed in the range of from about 0.1 to about 10 and preferably from about 1 to about 5 phr (parts by weight per 100 parts of resin).

The following examples are illustrative of the present invention, but are not to be construed as limiting the scope thereof in any manner.

EXAMPLE 1

A reaction vessel was employed which was fitted with a temperature indicator, a stirrer and a condenser attached to a separating device for aqueous and organic layers. Into such a vessel was charged 184.2 grams (2 moles) of glycerine, 736 grams of ethylene dichloride and 8.52 grams of boron trifluoride etherate. The temperature of the reaction vessel contents was raised to 55°–60°C and epichlorohydrin containing the various resins indicated in Table I was added over a period of 1 hour. The temperature was allowed to exotherm to 90°C (reflux) during the addition. After digesting for 30 minutes at 90°C, the contents were cooled to 84°C. This temperature was maintained as a quantity of 50 percent aqueous sodium hydroxide was slowly added over a 2-hour period. As the NaOH was added, water, produced by the reaction and introduced with the NaOH, was continuously removed as an ethylene dichloride-water azeotrope and the ethylene dichloride was separated from the water and returned to the reaction vessel via the separating device. After all the water added with the caustic and that produced by the epoxidation reaction had been removed, the contents were digested for 15 minutes at 83°C. The salt was then removed from the product-ethylene dichloride-salt slurry by filtration and the product recovered from the product-ethylene dichloride filtrate by removing the ethylene-dichloride by distillation under reduced pressure. Portions of each of the products were mixed with 4 parts of 2,4,6-tris(dimethylaminomethyl)phenol (DMP-30) per each 100 parts of the resin products and cured into ⅛ inch sheets at 250°F for 3 hours. The tensile strength, percent elongation and tensile modulus properties were obtained and are reported in the following Table I.

wherein X, $X_1$, $X_2$ and $X_3$ are independently selected from hydrogen, chlorine or bromine, A is selected from the group consisting of an alkylene or alkylidine group having from about 1 to about 8 carbon atoms, —O—, —S—, —S—S,

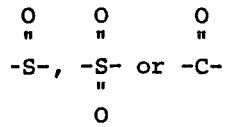

TABLE I

| Experiment No. | Polyepoxide Employed as a Mixture with Epichloro-hydrin | Equivalents of Epichloro-hydrin per mole of Glycerine | Equivalents of poly-epoxide per mole of Glycerine | Equivalents of Polyepoxide + Epichloro-hydrin per mole of Glycerine | % Epoxide of Product | Tensile Strength (PSI) | % Elon-gation | Tensile Modulus |
|---|---|---|---|---|---|---|---|---|
| 1(Control) | None | 2.6 | 0 | 2.6 | 29.9 | 15 | 6.4 | 75 |
| 2 | DER 331 | 2.465 | 0.135 | 2.6 | 27.0 | 71 | 12 | 189 |
| 3 | DGENPG | 2.467 | 0.135 | 2.6 | 27.0 | 54 | 12 | 133 |
| 4 | DGEH$_2$-Bis | 2.49 | 0.11 | 2.6 | 27.6 | 54 | 17 | 116 |

DER 331 = the diglycidyl ether of p,p'-isopropylidine diphenol having an epoxide equivalent weight of 188.
DGENPG = the diglycidyl ether of neopentyl glycol having an epoxide equivalent weight of 135.
DGEH$_2$-Bis — the diglycidyl ether of hydrogenated p,p'-isopropylidine diphenol having an epoxide equivalent weight of 239.

We claim:
1. Epoxy resins of the glycidyl ethers of glycerine type which are the dehydrohalogenated reaction product of
   A. a mixture comprising from about 0 to about 49 percent by weight of a polyhydroxy-containing compound free of epoxy groups and from about 51 to about 100 percent by weight of glycerine; with
   B. a mixture comprising
      1. from about 0.05 to about 0.65 epoxide equivalents per mole of (A) of a polyepoxide having more than one 1,2-epoxy groups which is a glycidyl ether of a dihydroxyl containing compound, and
      2. from about 1.35 to about 2.95 epoxide equivalents per mole of (A) of an epoxy alkyl halide;
   wherein the combined quantity of (B1) and (B2) is in the range of from about 2.0 to about 3.0 epoxide equivalents per mole of (A).
2. The product of claim 1 wherein component (1) of component (B) is in the range of from about 0.05 to about 0.65 and component (2) of component (B) is in the range of from about 2.0 to about 2.95.
3. The product of claim 1 wherein the polyepoxide is a polyglycidyl ether represented by the formula

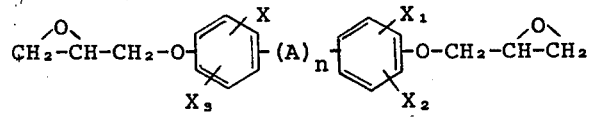

and n has a value of zero or 1.

4. The product of claim 1 wherein the polyepoxide is a diglycidyl ether of a hydrogenated bisphenol represented by the formula

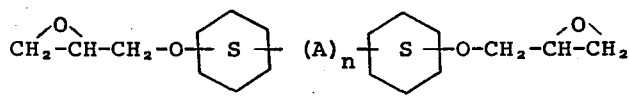

wherein A is selected from the group consisting of an alkylene or alkylidene group having from about 1 to about 8 carbon atoms, —O—, —S—, —S—S—,

and n has a value of zero or 1.

5. The product of claim 1 wherein the polyepoxide is a diglycidyl ether of neopentyl glycol.
6. The cured compositions resulting from heating a mixture comprising (a) a product of claim 1 and (b) from about 0.1 to about 10 phr of a catalyst selected from a tertiary amine or a Lewis acid complex.
7. The composition of claim 6 wherein the catalyst is a tertiary amine.
8. The composition of claim 7 wherein the tertiary amine is 2,4,6-tris(dimethylaminomethyl)phenol.

* * * * *